(12) United States Patent
Casey et al.

(10) Patent No.: US 9,004,347 B2
(45) Date of Patent: Apr. 14, 2015

(54) METHOD AND APPARATUS FOR VERIFYING STACK SIZE

(75) Inventors: David W. Casey, Salisbury, NC (US); Gregg A. Bryan, Morresville, NC (US); Karl U. Wuerminghausen, Canton, OH (US)

(73) Assignee: Greif Packaging LLC, Delaware, OH (US)

( * ) Notice: Subject to any disclaimer, the term of this patent is extended or adjusted under 35 U.S.C. 154(b) by 264 days.

(21) Appl. No.: 12/945,040

(22) Filed: Nov. 12, 2010

(65) Prior Publication Data

US 2012/0118945 A1 May 17, 2012

(51) Int. Cl.
  *G06F 17/00* (2006.01)
  *G06Q 10/08* (2012.01)
(52) U.S. Cl.
  CPC .................................. *G06Q 10/083* (2013.01)
(58) Field of Classification Search
  USPC .......................................... 235/375, 376, 385
  See application file for complete search history.

(56) References Cited

U.S. PATENT DOCUMENTS

| | | | | |
|---|---|---|---|---|
| 4,989,397 A | * | 2/1991 | Tomac et al. | 53/528 |
| 5,656,799 A | * | 8/1997 | Ramsden et al. | 177/2 |
| 2003/0015592 A1 | * | 1/2003 | Brabaw | 235/494 |
| 2004/0165748 A1 | * | 8/2004 | Bonner et al. | 382/101 |
| 2010/0082152 A1 | * | 4/2010 | Mishra et al. | 700/226 |

* cited by examiner

*Primary Examiner* — Michael G Lee
*Assistant Examiner* — Tabitha Chedekel
(74) *Attorney, Agent, or Firm* — Sand & Sebolt

(57) ABSTRACT

A method and apparatus for verifying stack size are disclosed wherein measured length and width dimensions of a stack of paperboard sheets are compared with length and width values of a label associated with the stack. The dimensions are typically measured as the stack travels along a conveyor. A no-match indicator is produced if there is not a match between the dimensions and values, and may include an alarm or a display on a video screen. The stack may be diverted to allow application of a correct label whereby the stack will be shipped to the correct customer.

16 Claims, 4 Drawing Sheets

| FIG-1A |
|---|
| FIG-1B |

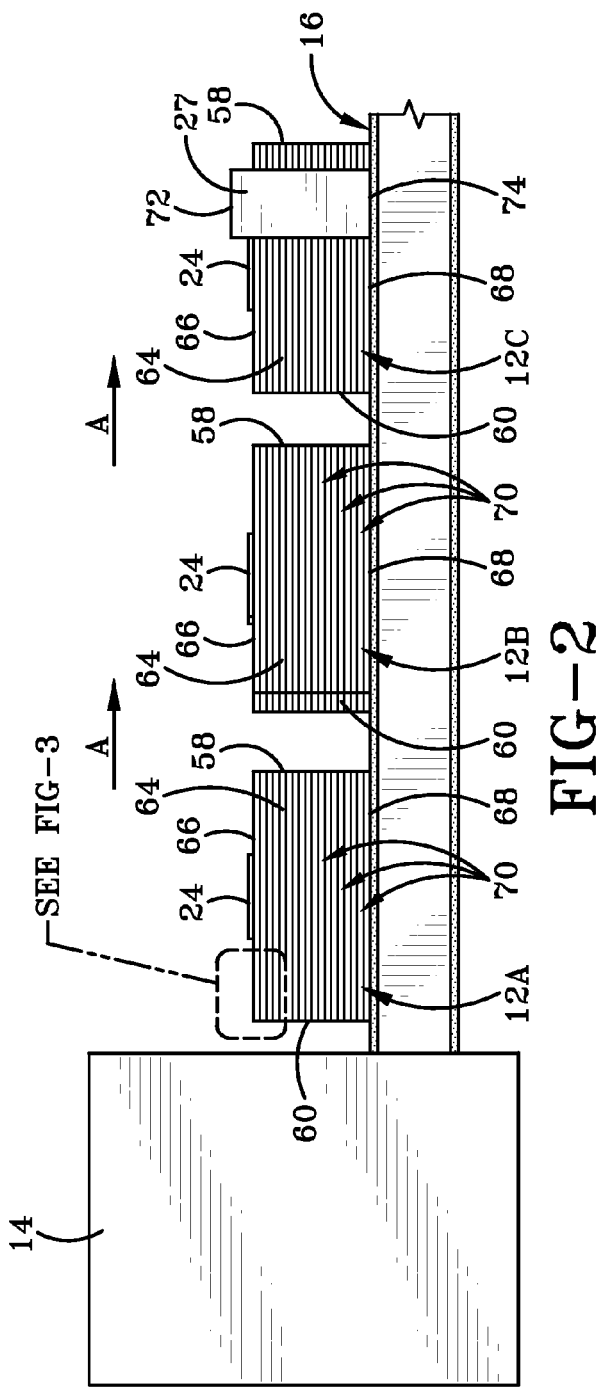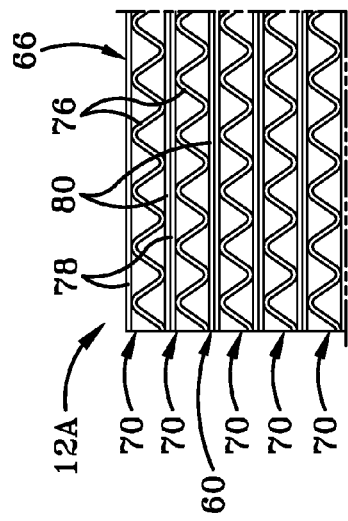

METHOD AND APPARATUS FOR VERIFYING STACK SIZE

BACKGROUND OF THE INVENTION

1. Technical Field

The present invention relates generally to a method and apparatus for handling cardboard or paperboard materials. More particularly, the present invention relates to a method and apparatus for handling stacks of paperboard sheets. Specifically, the present invention relates to a method and apparatus for verifying the size of the paperboard sheets.

2. Background Information

Corrugators and other machines for producing and handling corrugated cardboard materials are well known in the art. Corrugators are used to form corrugated paperboard, which minimally includes a wavy or fluted paper known as a corrugated medium which is glued to a flat sheet typically called a liner. Corrugated paperboard can include one or more layers of the corrugated medium and one or more liners. Many boxes are formed of a single wall corrugated board, which is a corrugated medium glued between two flat liners. Corrugated paperboard also includes, for example, double wall corrugated boards and triple wall corrugated boards. The double wall corrugated board includes two layers of corrugated medium with three flat liners, and the triple wall corrugated board includes three layers of corrugated medium and four flat liners. Boxes may also be formed of the double wall and triple wall corrugated boards.

Once the given type of corrugated paperboard is formed by the corrugator, the corrugator or another machine typically cuts the corrugated paperboard into flat rectangular sheets, which are formed into a stack with multiple sheets atop one another. Due to the large variety in sizes of boxes, the length and width dimensions of these paperboard sheets varies correspondingly. A stacking device or stacker is configured to handle multiple different sizes of sheets in a relatively rapid fashion. Thus, the stacker may produce a batch of sheets each having the same dimensions whereby each of the stacks has the same dimensions, then produce a subsequent batch immediately thereafter in which the sheets and stacks have dimensions which are different than the earlier batch. Normally, a stacker operator applies a run sheet or label to each stack which is supposed to correspond to the stack with regard to its dimensions and other relevant information. However, because the formation of the stacks is relatively rapid, and the change from a batch of stacks having a first size to a second batch of stacks having a second size likewise occurs relatively rapidly, it is easy for the stacker operator to inadvertently place the wrong run sheet or label on the stack. If this mistake is not caught and corrected, the incorrectly labeled stack may be shipped to the wrong customer. Thus, there is a need in the art for a method and apparatus for verifying the stack size and ensuring that the proper label is applied so that the stack is shipped to the correct customer. The present invention achieves this goal.

BRIEF SUMMARY OF THE INVENTION

The present invention provides a method comprising the steps of providing a first label associated with a stack of paperboard sheets, the first label comprising length and width values; measuring length and width dimensions of the stack with a measuring assembly; and determining where there is a match between the dimensions and values.

The present invention also provides an apparatus comprising a conveyor adapted for conveying a stack of paperboard sheets; a measuring assembly adjacent the conveyor adapted to measure length and width dimensions of the stack; a scanner adjacent the conveyor adapted to read a machine readable code associated with the stack to access length and width values; and a measurement-comparing device which is in communication with the measuring assembly and scanner and is adapted to facilitate comparison of the dimensions and values.

The present invention further provides an apparatus comprising a measuring assembly adapted to measure length and width dimensions of a stack of paperboard sheets; a scanner adapted to read a machine readable code which is associated with the stack and comprises length and width values; and a no-match indicator which is operatively connected to the measuring assembly and scanner and which is configured to indicate that there is no match between the dimensions and values.

BRIEF DESCRIPTION OF THE SEVERAL VIEWS OF THE DRAWINGS

FIG. 2 is a diagrammatic side elevational view take on line 2-2 of FIG. 1A.

FIG. 3 is an enlarged side elevational view of the encircled portion of FIG. 2 showing detail of the sheets of corrugated paperboard making up a given stack.

Figures 1, 1A:
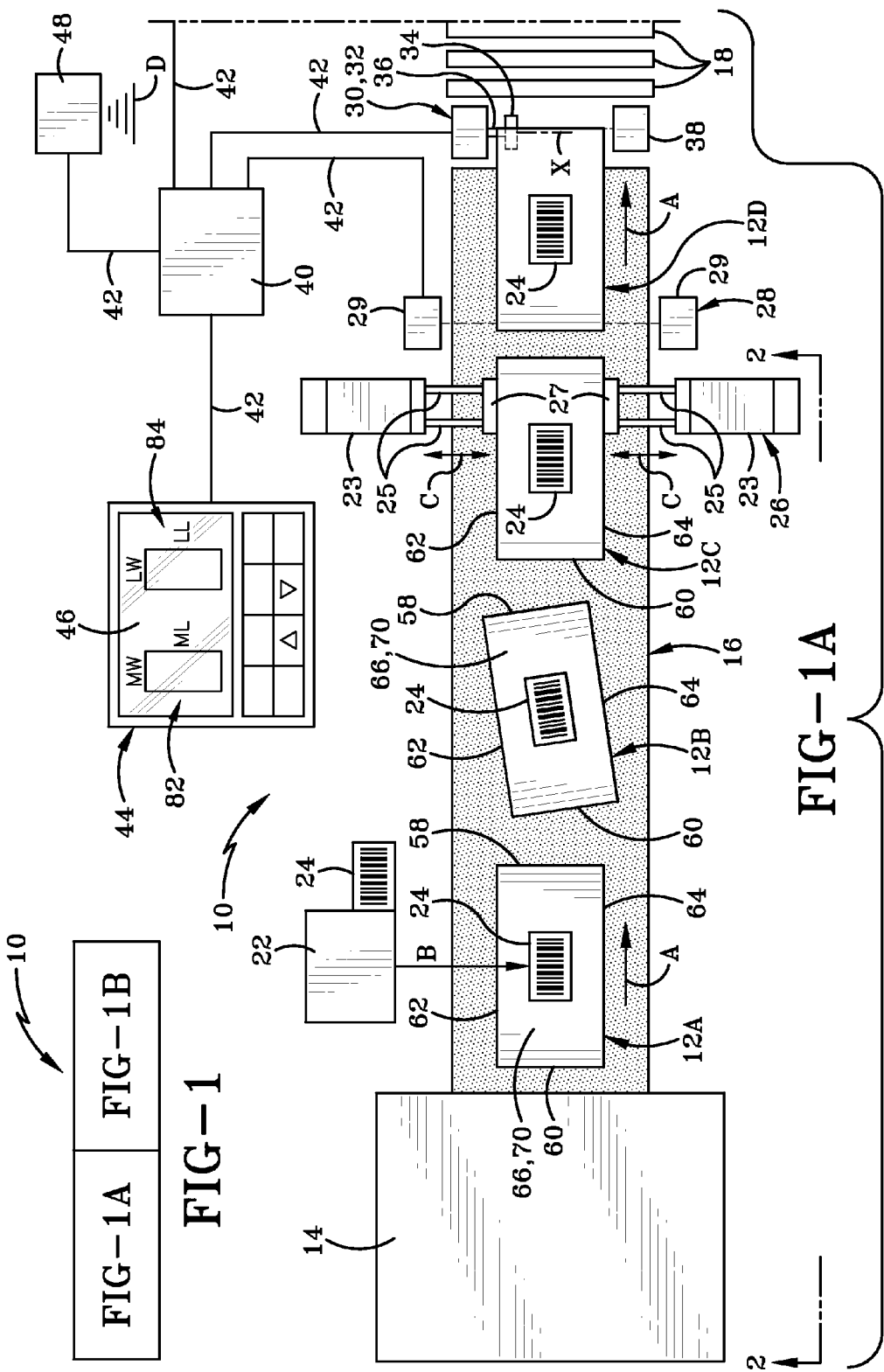
FIG. 1 is a diagrammatic figure showing the relationship between FIG. 1A and FIG. 1B.
FIG. 1A is a diagrammatic top plan view illustrating an upstream portion of the method and apparatus of the present invention.

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Figure 1B:
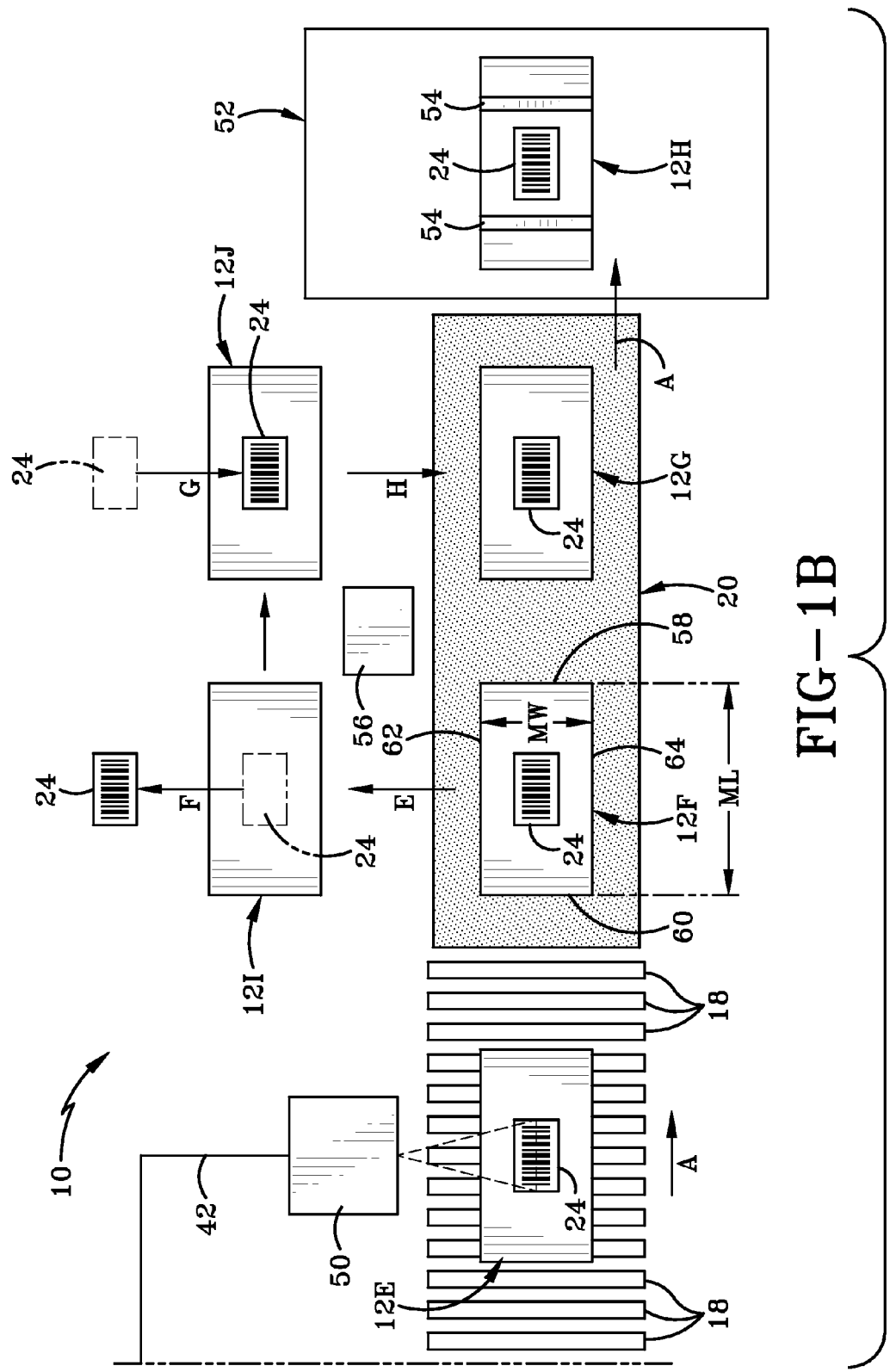
FIG. 1B is a diagrammatic top plan view illustrating a downstream portion of the method and apparatus of the present invention.

The verification apparatus of the present invention is shown generally at 10 in FIGS. 1, 1A and 1B. FIG. 1A illustrates the upstream portion of apparatus 10 while FIG. 1B illustrates the downstream portion of apparatus 10. Apparatus 10 is used to handle and verify the stack size of stacks of corrugated paperboard sheets, said stacks being labeled 12A-12J. Apparatus 10 includes a cuffing and stacking machine typically known as a stacker 14, a conveyor system which extends downstream from the downstream end of stacker 14 and may include a driven first conveyor belt 16, a plurality of parallel cylindrical rollers 18, and a driven second conveyor belt 20. A stacker operator 22 typically stands or sits at a location adjacent the downstream end of stacker 14 and the upstream end of the conveyor system for applying labels 24 to the various stacks 12 and to ensure the proper operation of stacker 14.

Apparatus 10 further includes a squaring device 26 downstream of stacker 14 and operator 22. Squaring device 26 includes a pair of linear actuators 23 on opposed sides of conveyor belt 16 with a corresponding pair of linear pistons 25 movably mounted on and actuated by actuator 23, and a squaring plate 27 mounted on the free ends of pistons 25. Apparatus 10 comprises a width and length measuring assembly which is adjacent and typically downstream of squaring device 26 and includes a width-measuring device 28 and a length-measuring device 30. Width-measuring device 28 in the exemplary embodiment includes a pair of ultrasound or other suitable sensors 29 positioned on opposite sides of conveyor belt 16. Length-measuring device 30 in the exemplary embodiment includes an encoder 32, a measuring wheel 34 which has a circular outer perimeter and is mounted via an axle 36 on encoder 32 to rotate about a horizontal axis X which extends transverse to the downstream direction. A resetting device 38 typically in the form of a photoeye or other suitable sensor is positioned generally opposite encoder 32 and wheel 34.

Apparatus 10 also includes a controller 40 which is in electrical or other communication such as by respective electrically conductive wires 42 with the sensors 29 of device 28 and encoder 32 of device 30. Resetting device 38 is in communication with encoder 32. Apparatus 10 may also include a display monitor 44 which includes a video display screen 46 and which is in electrical or other communication with controller 40 as by a corresponding wire 42. Apparatus 10 further includes an alarm 48 which is typically an audible alarm and may also be a visible alarm such that workers in the vicinity can hear the alarm and/or see the alarm when it is activated. Thus, alarm 48 typically includes a speaker or other sound-producing device, and may also include a visible indicator, typically a light which is illuminated and preferably configured to flash on and off when activated and is off when inactivated.

Apparatus 10 further includes a scanner 50 typically located just downstream of the measuring assembly and adjacent the conveyor system. Scanner 50 may be any type of scanner or scanning device or reading device for scanning or reading a machine readable code on one of labels 24 in order to read data therefrom. The data or information on each label 24 typically includes a customer's shipping destination in addition to a recorded length value and width value which are supposed to be associated with the length and width of the stack 12 to which a given label 24 is attached. Scanner 50 may be a bar code scanner, an RFID tag scanner or any other suitable scanner which is suitable for scanning or reading the type of machine readable code on label 24 to access the information thereon. Apparatus 10 further includes a banding machine or bander 52 for banding or wrapping bands 54 around a given stack 12 and securing bands 54 thereon. A bander operator 56 is typically standing or seated at a location adjacent bander 52 and the downstream end of the conveyor system, which in this case is along conveyor belt 20.

Before describing the operation of apparatus 10, stacks 12 will be described in greater detail. Each stack has parallel front and back edges 58 and 60, and parallel left and right side edges 62 and 64 which are perpendicular to front and back edges 58 and 60, whereby each stack is rectangular as viewed from above. Each stack has a rectangular flat horizontal top and bottom 66 and 68 such that bottom 68 is seated on the top surface of the conveyor system, which may be the top surface of conveyor belt 16 or 20, or the top surface of rollers 18, as the respective stack moves along the conveyor system. Each stack is formed of multiple flat horizontal rectangular sheets 70 of corrugated paperboard, each of which has the same overall configuration and dimensions. Thus, the front and back edges 58 and 60 also serve as the front and back edges of each sheet 70, while the left and right side edges 62 and 64 also serve as the left and right side edges of each sheet 70. The top sheet 70 in a given stack defines top 66 of the stack while the bottom sheet 70 defines the bottom 68 of the stack. As shown in FIG. 2, each squaring plate 27 has a top 72 and a bottom 74 defining therebetween a height which is equal to or greater than the height of a given stack 12 defined between top and bottom 66 and 68. The bottom 74 of each plate 27 contacts or is closely adjacent the upper surface of conveyor belt 16, while top 72 is spaced upwardly from the conveyor belt and at or above the height of top 66 of each stack.

FIG. 3 illustrates one embodiment of the flat parallel sheets 70 of corrugated paperboard which may be found in a stack 12. More particularly, each sheet 70 includes a corrugated medium 76 with a flat top liner 78 glued to the top of medium 76 and a flat bottom liner 80 glued to the bottom of medium 76 to form a single wall corrugated paperboard. It is noted, however, that each sheet 70 typically includes a layer of the corrugated medium 76 and at least one liner, and may include several layers of the medium and several liners, as discussed in the Background section of the present application with respect to the formation of, for instance, double wall or triple wall corrugated paperboard.

Figure 4:
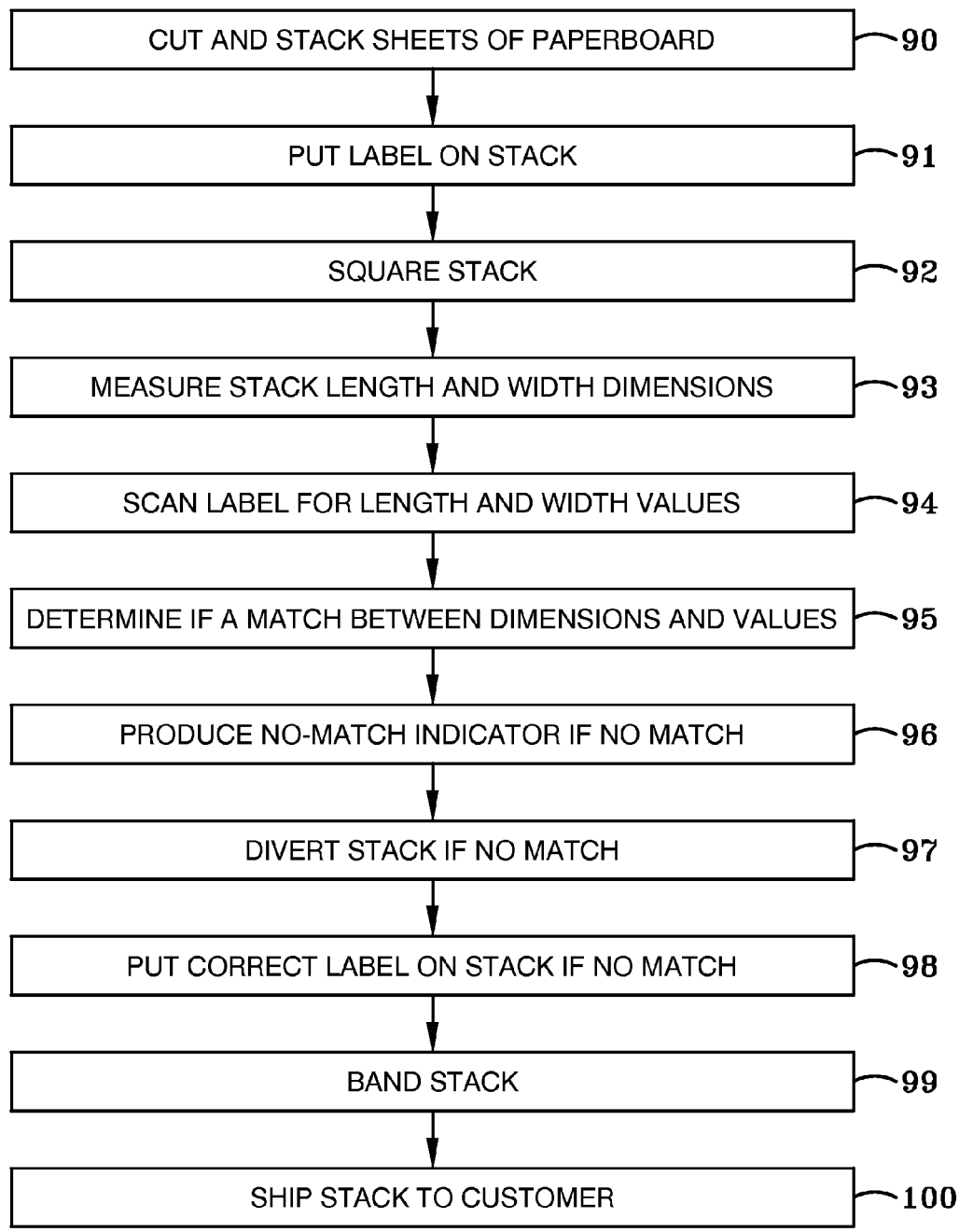
FIG. 4 is a flow chart generally showing the method of the present invention.

The operation of apparatus 10 is now described with primary reference to FIGS. 1A, 1B and 4. Near the beginning of the present description, it was indicated that the various stacks of sheets were indicated at 12A-12J. It is noted that each of these may be considered as separate stacks which travel serially downstream one after the other, or may alternately be considered as representing separate locations or stations through which a given stack 12 passes as it is transported downstream along apparatus 10. The downstream direction or movement of the various stacks is indicated at arrows A in FIGS. 1A, 1B and 2. Stacks 12 generally move downstream from stacker 14 to bander 52 along a primary pathway or route generally represented by position or stations 12A-12H, but may also be directed from this primary pathway along a diverted or alternate pathway or route generally represented by stations 12I and 12J, as discussed further below. Stacker 14 cuts long pieces of corrugated paperboard into rectangular sheets 70 having specific dimensions and then stacks them (block 90 in FIG. 4) one atop the other in order to form stacks 12. Stacker 14 positions each stack 12 atop conveyor belt 16 adjacent its upstream end so that the revolving conveyor belt 16 carries or conveys each stack 12 in the downstream direction of apparatus 10.

In the exemplary embodiment, stacker operator 22 moves a label 24 from a label storage location adjacent the conveyor system to a position on an associated stack 12, as indicated at arrow B. The label 24 is typically applied to the stack 12 (block 91 in FIG. 4) at position 12A and may, for example, be adhered to the stack by an adhesive or the like. The machine readable code of a given label 24 includes various information including a customer's shipping information or address and recorded length and width values which are supposed to be the same as the actual length and width of the stack to which label 24 is applied. The stack shown at 12A is in a squared position in which its left and right side edges 62 and 64 are parallel to the side edges of conveyor belt 16 and to the downstream direction indicated at arrows A, while the front and back edges 58 and 60 are perpendicular to said side edges and the downstream direction. However, a given stack may not be in this squared orientation, as illustrated at 12B, in which the side edges 62 and 64 are not parallel to the downstream direction nor the side edges of the conveyor belt, and the front and back edges 58 and 60 are not perpendicular to the downstream direction nor the side edges of conveyor belt 16. Thus, squaring device 26 is used to ensure that a given stack is in a squared orientation, whether this requires the stack to be moved relative to conveyor belt 16 or not. Typically, the stack is not exactly in a squared position prior to reaching location 12C adjacent squaring device 26, which thus repositions the stack so that it is in the squared orientation (block 92). More particularly, pistons 25 and plates 27 move back and forth transverse to the downstream direction as required in order to perform the squaring operation. As a given stack 12 passes between the squaring plates 27, actuators 23 are actuated to move the corresponding sets of pistons and squaring plate 27 linearly inwardly in the transverse direction whereby plates 27 respectively engage the left and right side edges 62 and 64 of the stack in order to reposition the stack to the squared orientation shown at 12C. In the event that the side edges 62 and 64 of the various sheets 70 of a given stack are not aligned with one another, the inward movement of squaring plates 27 ensures that each of the side edges 62 and 64 are respectively moved into vertical alignment with one another. Once the stack has been squared, actuators 23 are operated to retract pistons 25 and plates 27 away from the stack so that plates 27 disengage therefrom and allow further downstream movement of the stack to the position shown at 12D. In the squared orientation, the stack is typically centered between sensors 29 of the width-measuring device 28.

Width and length dimensions of the stack are then measured (block 93). As the stack is moving past device 28, the sensor 29 on the left of the conveyor system produces an ultrasonic wave (dashed lines) which is reflected off the left side edge 62 of the stack while the sensor 29 along the right side of the conveyor system likewise emits an ultrasonic wave (dashed lines) which reflects off the right side 64 of the stack. The ultrasonic waves allow the sensors to determine the distance from the sensor to the respective side edge of the stack, whereby this measured distance information is translated into a signal which is sent to controller 40 via the corresponding wire 42. Controller 40 includes a computer or logic circuit which is configured to calculate a measured width MW between the left and right side edges 62 and 64, as shown at position 12F in FIG. 1B. It is noted that other types of width-measuring devices may be used for this purpose. One possibility is that the squaring device may serve as a width-measuring device, which may use for instance a linear transducer to measure the distance which each piston 25 and/or plate 27 moves from a given position in order to determine the distance traveled and thereby the distance from a set point to the corresponding left and right side edges 62 and 64 of the stack. The distance traveled can likewise be translated into a signal for appropriate calculation by controller 40.

With continued reference to FIG. 1A, sensor or resetting device 38 senses the front edge 58 of the squared stack at position 12D to set encoder 32 or reset encoder 32 from any previous measurement of a downstream stack in preparation for measurement of the stack at position 12D. Encoder 32 is thus zeroed out in response to device 38 sensing the front edge 58 of the stack at 12D. After encoder 32 is set or reset, the bottom 68 of the stack, which is the bottom of the lowermost sheet 70, engages the circular outer perimeter of wheel 34 and rotates wheel 34 about axis X as bottom 68 moves downstream over wheel 34. More particularly, the bottom 68 at the front edge 58 thereof engages wheel 34 to begin its rotation, which is continuous until the back end 60 of bottom 68 moves past the top of wheel 34 and thus out of engagement with its outer perimeter, at which time wheel 34 ceases to rotate. Encoder 32 records the number of rotations of wheel 34 to produce a signal which is sent to controller 40 via the corresponding wire 42 whereby the computer or logic circuit of controller 40 calculates a measured length ML of the given stack, which is illustrated in FIG. 1B at position 12F.

The stack of sheets then continues downstream from the measuring assembly onto rollers 18 to reach position 12E, where scanner 50 scans or reads the machine readable code of label 24 (block 94) to access the various recorded information thereon as the stack moves downstream. This information includes the label-recorded width value and the label-recorded length value which are supposed to correspond to the actual or measured width and length of the stack respectively. Scanner 50 produces a signal corresponding to the label recorded width value and the label recorded length value and sends the signal to controller 40 via corresponding wire 42. Apparatus 10 includes the option that controller 40 send signals to display monitor 44 in order to display on screen 46 a first video image 82 corresponding to the measured dimensions of a given stack and a second video image 84 corresponding to the label recorded values of the label on or associated with the same stack. The first image 82 may, for example, include a rectangle as shown along with the measured width and measure length, indicated respectively at MW and ML on screen 46. Typically, the measured width MW and measured length ML would appear on screen 46 as numbers representing inches or other distance measuring units. Second image 84 may also include a rectangle along with the label recorded width value LW and label recorded length value LL shown adjacent the width and length of the corresponding rectangle on screen 46. Screen 46 may be conveniently located so that bander operator 56 can easily view the measured dimensions MW and ML as well as the label recorded values LW and LL to see whether the measured dimensions are the same as or match the label recorded values (block 95). Thus, if the measured width MW and measured length ML are respectively the same as (or within a predetermined acceptable tolerance or range of) the label recorded width value LW and label recorded length value LL, then the label 24 which is applied to or associated with the corresponding stack 12 is the correct label. More particularly, a correct label includes the correct customer shipping information as well as the correct length and width values which match the measured length and width dimensions for the corresponding stack. On the other hand, if the measured width MW is different than or outside the acceptable range of the label recorded width value LW, or the measured length ML is different than or outside the acceptable range of the label recorded length value LL, then there is not a match between the dimensions and values, and the label from which the information was obtained is not the correct label for the stack to which it is applied or with which it is associated. An incorrect label would thus also typically include incorrect customer shipping information whereby using such a label would result in shipping the corresponding stack to the wrong customer. Displaying video images 82 and 84 on screen 46 where the dimensions and values do not match thus provides a measurement comparison device and a no-match indicator or incorrect label indicator which operator 56 or another marker may view (block 96).

Another way of making the bander operator 56 or another worker aware of the improper labeling of a given stack relates to the use of alarm 48. Thus, instead of signaling display monitor 44 to produce images 82 and 84 on screen 46 for comparison, controller 40 may serve as a measurement comparison device. Thus, controller 40 may compare the measured dimensions MW and ML to the corresponding recorded values LW and LL to determine whether there is a match therebetween (block 95) and thus whether a given label 24 is the correct or incorrect label applied to or associated with a given stack 12. If there is a match and the label is the correct label in accordance with the determination of the computer or logic circuit of controller 40, then alarm 48 is not activated. If on the other hand, controller 40 determines that there is not a match and that a given label 24 is the incorrect label for a given stack, controller 40 controls alarm 48 to activate alarm 48 to produce a no-match indicator (block 96) or incorrect label indicator in the form of an audible and/or visible alarm, as indicated at D in FIG. 1A. Alarm 48 is configured to effectively alert bander operator 56 or another worker to the fact that a given label 24 is an incorrect label for a given stack.

Regardless of which method is used to alert operator 56, the remaining part of the procedure is the same. If the label 24 which is applied to a given stack 12 is the correct label, then operator 56 allows the stack to be transported downstream via conveyor belt 20, continuing along the primary pathway through positions 12F and 12G to the destination represented by bander 52 at position 12H, where bander 52 wraps bands 54 around the corresponding stack 12 (block 99) in preparation for shipment to the correct customer. However, if the label is an incorrect label, the stack indicated at 12F is diverted from the primary pathway (block 97) prior to reaching destination 12H to instead travel along the alternate pathway, and thus may be removed from the conveyor system (arrow E) to a location shown at 12I so that the incorrect label 24 may be removed (arrow F) from its location (dashed lines) on the diverted stack and so that a correct label may be applied (arrow G, block 98) to the diverted stack as illustrated at location 12J. The correct label includes the correct customer shipping information and correct length and width values which match the measured length and width dimensions for the diverted stack. Once the correct label 24 is applied to the stack, the stack and correct label can then be placed on the conveyor system (arrow H) at position 12G for subsequent movement to bander 52 destination 12H, or may be placed from position 12J directly on bander 52 for the application of straps 54 (block 99) without being repositioned on conveyor belt 20. The movement of a given stack of sheets from position 12F to positions 12I, 12J and 12G or the like may be handled by operator 56 or another worker, and may involve the use of additional equipment if desired.

Thus, whether a given stack arrives at position 12H with a correct label via the primary pathway or via the diverted or alternate pathway, the stack will then be shipped to the correct customer (block 100) due to the fact that the correct label has been applied to that stack. Typically, the correct label will be read by another scanner prior to shipping so that the stack will be properly handled and placed for the correct shipping. Thus, multiple stacks which are cut and stacked by stacker 14 will travel downstream therefrom along either the primary pathway or the alternate pathway to reach the destination at 12H. As discussed in the Background section of the present application, a batch of stacks 12 having the same measured dimensions may include multiple stacks or only a few stacks. The present process thus catches and corrects the mislabeling of stacks in one batch which typically occurs during the transition of one batch of stacks having a given size of sheets 70 to another batch of stacks having a different size of sheets 70.

In short, apparatus 10 and the use thereof provides the ability to ensure that the correct label is mounted on a given stack 12 of sheets of corrugated paperboard. Thus, apparatus 10 is configured to eliminate the shipment of improperly labeled stacks to the wrong customer.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described.

The invention claimed is:

1. A method comprising the steps of:
   providing a first label associated with a stack of paperboard sheets, the first label comprising length and width values;
   applying the first label to the stack;
   measuring length and width dimensions of the stack with a measuring assembly;
   reading a machine readable code on the first label to access the length and width values;
   determining whether there is a match between the dimensions and values such that if there is a match, the first label is a correct label which includes correct customer shipping information and if there is not a match, the first label is an incorrect label which includes incorrect customer shipping information whereby using the incorrect label would result in shipping the stack to a wrong customer;
   if there is a match per the step of determining, shipping the stack to a correct customer in accordance with the correct customer shipping information of the first label; and
   if there is not a match per the step of determining, applying to the stack a second label which includes correct customer shipping information and shipping the stack to a correct customer in accordance with the correct customer shipping information of the second label.

2. The method of claim 1 further comprising the step of producing a no-match indicator if there is not a match per the step of determining.

3. The method of claim 2 wherein the step of producing comprises the step of activating one of an audible and visible alarm.

4. The method of claim 1 wherein the second label comprises length and width values which match the length and width dimensions.

5. The method of claim 1 further comprising the step of removing the first label from the stack if there is not a match per the step of determining.

6. The method of claim 1 wherein the step of determining comprises the step of comparing the dimensions with the values via a logic circuit.

7. The method of claim 1 further comprising the step of displaying on a video screen information related to the dimensions and values.

8. The method of claim 1 further comprising the steps of transporting the stack along a primary pathway toward a destination; and diverting the stack from the primary pathway prior to reaching the destination if there is not a match per the step of determining.

9. The method of claim 8 wherein the step of applying the second label comprises the step of applying the second label to the diverted stack.

10. The method of claim 9 further comprising the step of positioning the stack and second label at the destination.

11. The method of claim 8 further comprising the step of moving the stack along the primary pathway to reach the destination without diverting the stack from the primary pathway if there is a match per the step of determining.

12. The method of claim 1 further comprising the step of moving the stack on a conveyor; and measuring one of the length and width dimensions during the step of moving.

13. The method of claim 1 further comprising the step of squaring the stack with a squaring device.

14. The method of claim 1 further comprising the step of banding the stack with a banding machine.

15. The method of claim 1 wherein the first label is one of a plurality of first labels; the stack of paperboard sheets is one of a first batch of first stacks of first paperboard sheets each having the same dimensions whereby each of the first stacks has the same dimensions; and the first labels are respectively associated with the first stacks; and further comprising the steps of provide a second batch of second stacks of second paperboard sheets wherein each of the second sheets has the same dimensions whereby each of the second stacks has the same dimensions such that the dimensions of the second sheets are different than the dimensions of the first sheets and the dimensions of the second stacks are different than the dimensions of the first stacks;

conveying on a conveyor the first stacks serially downstream one after another including a last one of the first stacks;

conveying on the conveyor the second stacks serially downstream one after another including a first one of the second stacks immediately following the last one of the first stacks;

applying a correct label on the last one of the first stacks;

applying one of the first labels to the first one of the second stacks; and wherein the step of determining comprises the step of determining that the one of the first labels applied to the first one of the second stacks is an incorrect label so that the second label is applied to the first one of the second stacks to ensure that the first one of the second stacks is shipped to the correct customer in accordance with correct customer shipping information of the second label.

16. The method of claim 15 further comprising the steps of producing with a stacker the first batch; and producing with the stacker the second batch immediately after the step of producing the first batch; and wherein the step of conveying the first stacks comprises the step of conveying the first stacks downstream on the conveyor from adjacent the stacker; and the step of conveying the second stacks comprises the step of conveying the second stacks downstream on the conveyor from adjacent the stacker.

* * * * *